Aug. 14, 1962 B. E. HOOPER 3,049,590
NEGATIVE ENLARGER USING CLOSED LOOP TELEVISION
Filed July 17, 1959 2 Sheets-Sheet 1
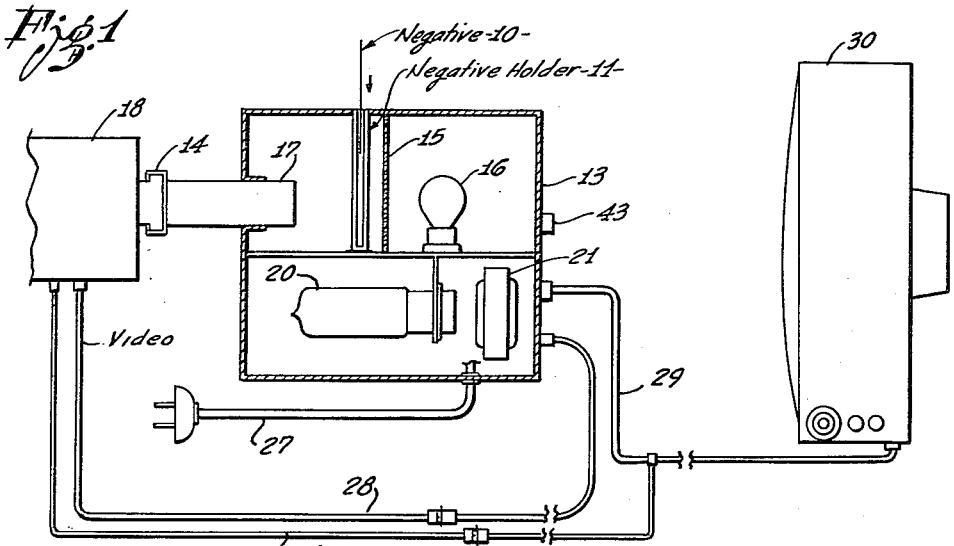
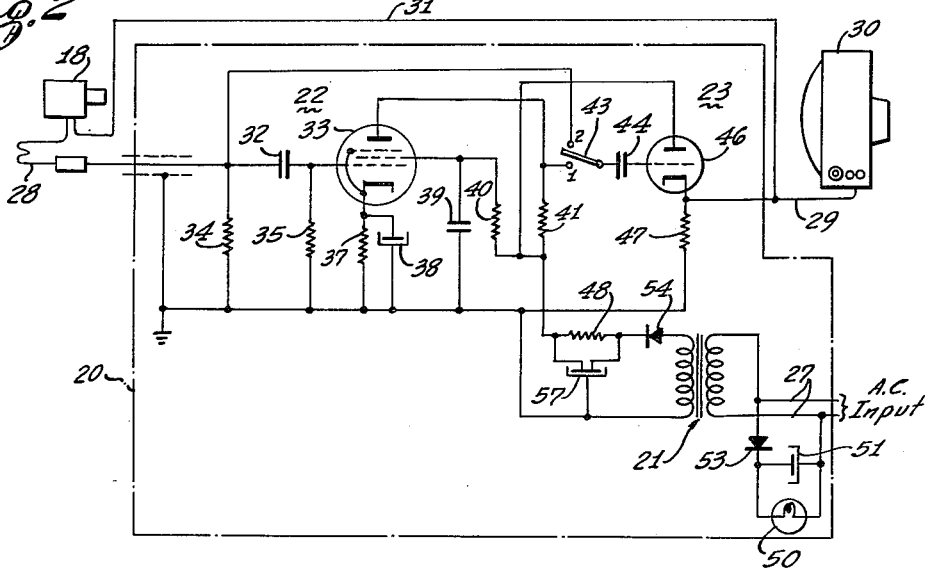
INVENTOR:
Brian E. Hooper
Attorneys Aug. 14, 1962   B. E. HOOPER   3,049,590
NEGATIVE ENLARGER USING CLOSED LOOP TELEVISION
Filed July 17, 1959   2 Sheets-Sheet 2
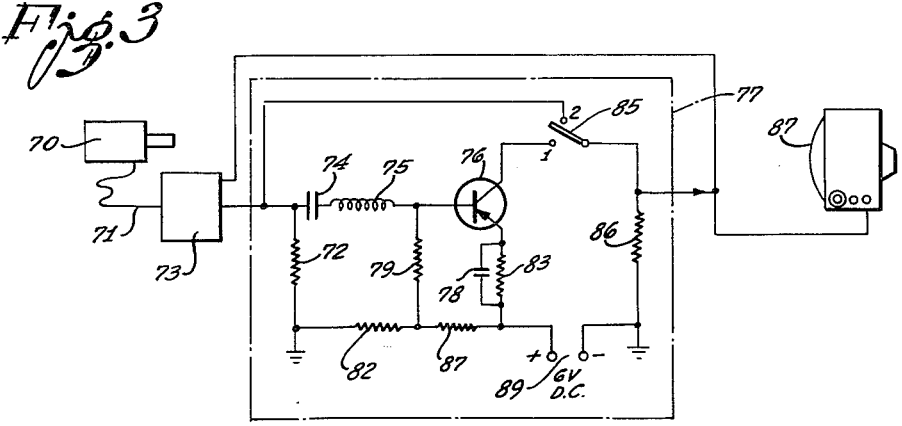
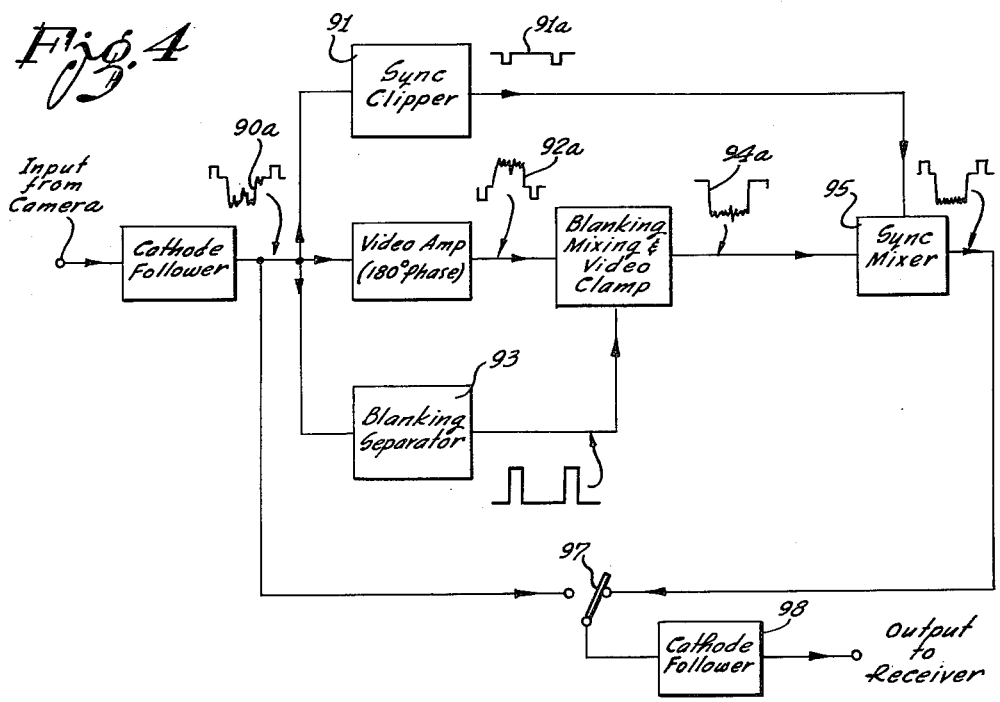
INVENTOR:
Brian E. Hooper
Attorneys,

United States Patent Office 3,049,590
Patented Aug. 14, 1962

3,049,590
NEGATIVE ENLARGER USING CLOSED
LOOP TELEVISION
Brian E. Hooper, 3390 Camino De La Cumbre,
Sherman Oaks, Calif.
Filed July 17, 1959, Ser. No. 827,949
7 Claims. (Cl. 178—6.8)

This invention relates to apparatus for viewing photographic images and, more particularly, to an enlarger for providing an enlarged image of a photograph.

A photographic negative is a reversed image obtained by developing a sensitized and exposed photographic emulsion. The term "negative" is utilized because the greater the brilliance of the light arriving from the photographed object, the blacker is the image. The image is blacker because of the greater reduction and retention of silver in the emulsion after fixing. In order to reverse the negative image and obtain a positive image of the photographed object, the negative is printed. The printing process consists of exposing the negative on a sensitive emulsion and thereafter developing and fixing the exposed emulsion. The print is a positive image because the darker portions of the negative allow less light through to the emulsion than do the lighter portions.

It is difficult for an individual to visualize the reversed appearance of the photographic negative or to determine what a positive print of the negative will look like. Facial expressions, for example, are very hard to interpret when viewed in negative form. Positive prints or proofs have, therefore, been required to judge the final appearance of the photograph. A similar problem exists in color photography because it is difficult to determine from the color negative what will be the appearance of the color print.

In a specific illustrative embodiment of this invention, a photographic printing process is not required in order to provide a positive enlarged image of the photographic negative. The photographic negative or slide to be viewed is inserted in a viewer which is attached to a conventional television camera. The viewer includes optical means for projecting an image of the negative to the television camera. The television camera scans the negative image line by line and provides video signals in accordance therewith to a unity gain phase-reversing circuit.

In the standard transmitted television signal utilized in the United States, white corresponds to negative modulation and is represented by an amplitude of the carrier envelope that does not exceed 15 percent of the maximum amplitude of the carrier envelope. Black represents an envelope amplitude which is 75 percent of the maximum amplitude of the carrier envelope. The blanking pulses have an amplitude corresponding to black and the synchronizing pulses occupy the range between 75 and 100 percent of the maximum envelope amplitude and so are transmitted as blacker than black.

In the viewing apparatus of this invention, the television camera can be part of a closed loop television system so that a carrier signal is not necessary. The relative amplitudes of the various components, however, are the same with a black indication being relatively positive with respect to a white indication and the various graduations of color from darker to lighter falling therebetween.

In one specific embodiment of the invention, the video signals alone without the blanking and synchronizing pulses from the television camera are introduced to the unity gain phase-reversing circuit. The phase-reversing circuit in one embodiment includes a single stage pentode amplifier which provides for a 180 degree phase shift between signals introduced to the control grid of the pentode and the signals appearing at its anode. The phase reversed video signals are coupled through a control switch and a cathode follower to a conventional television receiver.

By phase reversing the video signal, relatively positive signals are converted to relatively negative signals and vice versa. As introduced to the television receiver from the cathode follower, the amplitude of the original signals corresponding to a white indication are converted to an amplitude of a black indication. The entire remaining illumination spectrum between the white and black indications is also reversed.

The blanking and synchronizing pulses from the television camera or from an external generator common to the camera and the receiver are provided without phase reversal to the television receiver. Due to the phase reversal of the video signals, a positive image of the negative inserted in the viewer is provided at the television receiver. With the switching means in one position, the video signals are phase reversed to provide a positive image and with the switching means in a second position, the video signals are coupled directly to the cathode follower without phase reversal.

Further features of this invention pertain to the provision in a second embodiment of the invention of a transistor phase shifter which is powered by a small battery. The battery also energizes the source of illumination in the viewer optical system.

Still further features of this invention relate to the provision of means for separating the blanking and synchronizing pulses from a composite television signal including the pulses and also video signals representing the scanned image. The composite signals are also introduced to a phase shifter and provided therefrom to a clamping arrangement. The clamping arrangement is controlled by the separated blanking pulses to re-establish the blanking level of the phase shifted signals. The separated synchronizing pulses are modulated with the signals from the clamping arrangement to provide composite television signals in which the video signals but not the blanking and synchronizing pulses have been phase reversed.

Further advantages and features of this invention will become apparent upon consideration of the following description when read in conjunction with the drawing wherein:

FIGURE 1 is a diagrammatic and partial sectional view of the viewing apparatus of this invention;

FIGURE 2 is a circuit representation of one embodiment of the phase shifting amplifier of the viewing apparatus of this invention;

FIGURE 3 is a circuit representation of a second embodiment of a phase shifting amplifier utilized in the viewing apparatus of this invention; and FIGURE 4 is a functional diagram of a third embodiment of a phase shifting amplifier utilized in the viewing apparatus of this invention.

Referring first to FIGURE 1, a housing 13 encloses a number of components of the viewing apparatus of this invention. The housing 13 supports a lens system 17 which is coupled by a universal lens mounting clamp 14 to a conventional television camera 18. The viewing apparatus is utilized to provide an image of a photographic negative or slide 10 at a television receiver 30. The negative 10 is inserted in a negative holder 11 which is, in turn, inserted in the housing 13. The negative holder 11 is positioned to interpose the negative 10 between a lamp 16 and the lens system 17. The light from the lamp 16 is diffused by an optical system or diffuser 15 and passes through the negative 10 to the lens system 17. The lens system 17 may be pre-focused to infinity to provide parallel rays of the negative image to the television camera 18 so that if the lens of the camera is pre-focused to infinity the image of the negative will be projected, correctly focused, on the receiving surface of the camera. In the conventional television system utilized in the United States, a monochrome camera scans the image at a repetition rate of 30 frames per second with each frame consisting of two interlaced fields. The image is scanned by 262.5 successive horizontal lines for each field or 525 lines for each frame. The horizontal line frequency is 15,750 lines per second and the camera is blanked between horizontal lines and between fields.

The output of many conventional cameras consists of the video signals, which are provided at one terminal, and the blanking and synchronizing pulses provided at another terminal. In the embodiment of the invention illustrated in FIGURE 4 and hereafter described, the video signals and the blanking pulses are provided at a single output terminal of the television camera. The blanking and synchronizing pulses occur, of course, between the successive horizontal line video signals. The horizontal blanking pulses are allocated 16 percent of the time (63.5 microseconds) available for scanning one line or approximately 10 microseconds, and the vertical blanking pulses are allocated approximately 7.5 percent of the time for each field or approximately 1250 microseconds.

The video signals from the television camera 18 are coupled through a cable 28 which may be a coaxial cable back to an amplifier unit 20 supported in the housing 13. The output from the amplifier unit 20 is coupled through a cable 29, which also may be coaxial, to the television receiver 30.

FIGURE 2 illustrates the circuit arrangement of the unit 20. As shown in FIGURE 2, the video signals coupled through the coaxial cable 28 are provided across a 75 ohm terminating resistor 34 in the unit 20. The video signals across the resistor 34 are coupled through a capacitor 32 to the control grid of a pentode 33 of an amplifier 22. The pentode 33 functions to reverse the phase of the video signals appearing at its control grid across the conventional grid leak resistor 35. Anode potential for the pentode 33 is supplied from an alternating current input through leads 27 and a transformer 21. A lamp 50 coupled across the lead 27 by a diode 53 provides a source of illumination for the negative to be viewed. The diode 53 functions as a half-wave rectifier so that unidirectional pulses are coupled through the lamp 50. A capacitor 51 shunted across the lamp 50 smooths the unidirectional pulses maintaining the energization of the lamp 50 between pulses in order to avoid modulating the light, and hence the viewed picture, with alternating signals derived from the alternating current power supply.

The secondary of the transformer 21 is coupled through a diode 54 to a smoothing network consisting of a resistor 58 and a double capacitor 57. The smoothed half cycles are provided through a plate resistor 41 to the anode of the pentode 33 and through a screen grid resistor 43 to the screen grid of the pentode 33 which is coupled to ground by a capacitor 39. The cathode of the pentode 33 is coupled to ground through a cathode resistor 37 and a degenerative capacitor 38. The suppressor grid is coupled to the cathode of the pentode 33.

In the absence of input video signals, the pentode 33 is conductive. The video signals to the pentode 33 are phase reversed because a relatively positive signal at the control grid increases conduction through the pentode 33 to increase the voltage across the anode resistor 41. The increased voltage across the resistor 41 causes the potential at the anode of the pentode 33 to decrease. In this manner, a change in potential at the control grid provides for a corresponding opposite change in potential of the anode. The circuit parameters of the various components in the amplifier 22 are selected to provide a gain of unity.

The phase shifted signals at the anode of the pentode 33 are coupled through terminal 1 of a switch 43 and a coupling capacitor 44 to a triode 46 which forms part of a cathode follower 23. The switch 43 is a two position switch which appears, as shown in FIGURE 1, on the front of the viewer housing 13. When the switch 43 is set at its terminal 1, the phase shifted signals are provided from the unit 20 to the television receiver 30. When the switch 43, however, is set at its terminal 2, the video signals appearing across the resistor 34 are shunted without phase shift directly through the switch 43 to the cathode follower 23. The cathode follower 23 functions to isolate the phase shifting amplifier 22 from the television receiver 30. The video signals developed across a 75 ohm cathode resistor 47 of the triode 46 are coupled through the coaxial cable 29 to the television receiver 30.

By phase reversing the video signals, relatively positive signals from the camera 18 are converted to relatively negative signals to the receiver 30. The original relatively positive signals which represented black now represent white and vice versa. As introduced to the television receiver 30 from the cathode follower 23, the amplitude of the original signals corresponding to a white indication are converted to an amplitude of a black indication. The reversal also reverses the entire graduated light spectrum between the black and the white signals.

The synchronizing and blanking pulses from the camera 18 are provided through the cable 31 directly to the television receiver without phase reversal. The image provided at the receiver 30 is, therefore, the conventional television image but with the black to white spectrum image reversed. The image is, therefore, a positive or reversed image of the negative 10.

The positive image may, in this manner, be viewed to judge the negative without the usual delay and expense of obtaining a positive print. The appearance of an enlarged print of the negative is, in this manner, also apparent. The position of the negative 10 in the holder 11 or the position of the holder 11 in the housing 13 can be adjusted to effectively crop or blank a portion of the negative so that the appearance of an enlarged print of a portion of the negative can be determined.

By operating the switch 43 to its terminal 2, an enlarged negative image is provided at the receiver 30. The difference in effect between the positive and negative images is, therefore, readily observable by successively operating the switch 43. If the image inserted in the holder is a positive image or transparency, an enlargement thereof is provided at the receiver 30 with the switch 43 set at terminal 2. If a reversed image is not required, e.g., a transparent positive test pattern, an amplifier and switch is unnecessary.

In the embodiment of the invention illustrated in FIGURE 3, a PNP junction transistor 76 is utilized to provide for the phase reversal of 180 degrees phase shift of the video signals instead of the pentode 33. The video signals from a camera 70 are coupled through a cable 71 to a separator circuit 73.

In the embodiment of the invention shown in FIGURE 1, the video signals are supplied from the camera at one cable and the synchronizing and blanking pulses at another. If the composite video signal including the blanking and synchronizing pulses and the video signals is provided through a single cable, the synchronizing and blanking pulses are readily separated from the video signals. Separator circuits for separating the pulses from the composite signal are conventional in the art.

The blanking and synchronizing pulses from the separator circuit 73 are provided directly to a receiver 89 and the video signals are coupled to the transistor amplifier 77. In the amplifier 77, the video signals are provided across a 75 ohm terminating resistor 72. The signals across the resistor 72 are coupled through a coupling capacitor 74 and an inductor 75 to the base electrode of the transistor 76.

The transistor 76 is normally conductive being forward biased by a biasing path by a biasing arrangement from a six volt potential source 89 through the two serially connected resistors 87 and 82 to ground. The junction between the resistor 87 and 82 is coupled through a base resistor 79 to the base electrode of the transistor 76. The emitter electrode, which is coupled to the source 89 through the parallel network including an emitter resistor 83 and a shunting capacitor 78, is at a more positive potential than the base electrode due to the voltage divider effect of the resistor 87 and 82. With the emitter electrode being positive with respect to the base electrode, the PNP transistor 76 is normally conductive if a switch 85 is set to establish a connection to the collector electrode. With the switch 85 set at its terminal 1, establishing the connection to the collector electrode, the grounded resistor 86 is coupled thereto.

A relatively positive video signal at the base electrode of the transistor reduces conduction through the transistor 76 to decrease the potential across the collector resistor 86 so that a phase reversal is accomplished by the transistor 76. The signals across the resistor 86 are coupled to the television camera 87 which provides a visual indication of the positive image of the negative.

If an inversion of the image is not required, the switch is set at its terminal 2 to effectively disconnect the transistor phase shifting circuit. With the switch 85 at its terminal 2, the video signals are coupled directly to the receiver 87 without phase reversal.

In the embodiment of the invention depicted in FIGURE 4, composite television signals, including video signals representing the scanned image and the synchronizing pulses, are provided from the television camera to a cathode follower 90. With a switch 97 positioned as shown in FIGURE 4, the viewing apparatus phase reverses the television signals received from the cathode follower 90 and provides them through a cathode follower 98 to the television receiver. With the switch moved to the left, the television signals are coupled directly through the switch 97 and the cathode follower 98 to the television receiver without phase reversal.

Assuming that the switch 97 is positioned to the right as shown in FIGURE 4, the composite television signals from the cathode follower 90 are introduced to a synchronizing clipper circuit which separates the synchronizing pulses from the composite television signals. The composite television signals 90a are shown at the output of the cathode follower 90 and the separated horizontal synchronizing pulses 91a are shown at the output of the synchronizing clipper 91. The composite television signals are also coupled through a 180 degree phase shifting video amplifier 92. The phase shifted composite video signals 92a from the amplifier 92 are introduced to a blanking mixer and video clamp 94. The blanking mixer and video clamp 94 is controlled by a blanking separator 93 to which the composite television signals 90a are also provided. The separated blanking pulses from the blanking separator 93 function to clamp the phase reversed composite video signals 92 at a predetermined potential during the blanking intervals. The clamping of the phase reversed composite signals during the blanking intervals functions to restore the magnitude of the phase reversed signals to the usual amplitude for the blanking pulses before phase reversal. The signal 94a from the blanking mixer and video clamp 94, therefore, is a composite television signal including the phase reversed video signals with blanking pulses that are in phase and at the same amplitude as the blanking pulses in the composite signal 90a from the cathode follower 90. The signal 94a is introduced to a synchronizing mixer 95 which modulates the separated synchronizing pulses 91a from the clipper 91 with the composite signal 94a from the blanking mixer and video clamp 94. The composite signal 95a from the synchronizing mixer 95 includes, therefore, the phase reversed video signals with conventional or in phase blanking and synchronizing pulses. The composite signal 95a is coupled through the switch 97 and the cathode follower 90a to the television receiver.

Although this application has been disclosed and illustrated with reference to particular applications, the principles involved are susceptible of numerous other applications which will be apparent to persons skilled in the art. For example, a number of negative images may be simultaneously scanned, and the system may include television transmission instead of being closed-loop. When the signals are transmitted, the phase reversal may be provided at either end. Moreover, the components of the system, including the television camera, the viewer, the amplifier and phase reversing circuit may be packaged in one unit having a single output connection for the television receiver. The invention is, therefore, to be limited only as indicated by the scope of the appended claims.

As used in the claims, the term "electrically connected" is intended to indicate a connection as by wires in contrast to a wireless transmission and reception of signals.

I claim:

1. A viewer for providing an enlarged image of a transparency, including, a housing, means operatively connected to the housing for holding the image in fixed position, means supported by the housing on one side of the image-holding means for illuminating the image, means including an optical system supported by the housing relative to the image-holding means and the light source for projecting the rays representing an image of the transparency in a particular relationship to one another, means disposed relative to said optical system for scanning the projected image and for providing electrical signals representing the successive illumination of portions of the projected image, an amplifier electrically connected to said scanning means for phase reversing said electrical signals to reverse the represented illuminations thereby, a receiver connectable to said amplifier and to said scanning means for providing a visual indication of the electrical signals, and switching means electrically connected to said receiver and to said scanning means and said amplifier for connecting said receiver to either said scanning means or to said amplifier.

2. In a closed loop television system having a television camera and a television receiver, a camera adapter for attachment to the television camera, including, a housing defining a slot for receiving a photographic negative to be viewed at the television receiver, a source of light supported in the housing on one side of the slot for providing light through a negative inserted through the slot of the housing, means in the housing for supporting an inserted negative adjacent said source, an optical system mounted on said housing and extending through one side of the housing from the other side of the inserted negative so as to receive the light transmitted through the negative from the source, said optical system projecting the light received from the negative in parallel rays, fastener means for attaching the optical system to the television camera to shield the camera lens and to facilitate the scanning of projected light from said optical system, and circuit means connected electrically to the television camera and the television receiver for phase inverting the video signals from the camera and for introducing them to the receiver.

3. In a closed loop television system having a television camera and a television receiver, a camera adapter for attachment to the television camera, including, a housing defining a slot for receiving a photographic negative to be viewed at the television receiver, a source of light supported in the housing on one side of the slot for providing light through the slot of the housing, means in the housing for supporting an inserted negative adjacent said source, an optical system mounted on said housing and extending through one side of the housing from the other side of the inserted negative so as to receive the light transmitted through the negative from the source, said optical system projecting the light received from the negative in parallel rays, fastener means attaching the optical system to the television camera to shield the camera lens and to facilitate the scanning of projected light from said optical system, circuit means positioned in the housing and having a unity gain video amplifier electrically coupled to the television camera for phase reversing the video signals from the television camera, means connected electrically to the amplifier and synchronized with the video signals from the camera for clamping the signals from said amplifier during the blanking intervals of the video signals from the camera to remove the synchronizing and blanking pulses inverted by said amplifier, means connected electrically to the camera and synchronously controlled by the video signals from the camera for generating synchronizing signals for the receiver, and means connected electrically to said generating means and to said clamping means for mixing the generated synchronizing signals with the inverted and clamped video signals and for introducing the mixed signals to the television receiver.

4. A viewer for providing an enlarged image of a transparency, including an optical system for projecting an image of the transparency, means disposed relative to the optical system for sequentially scanning successive positions in the projected image and for providing electrical signals representing the characteristics of the image at the successive scanned positions, means connected electrically to the scanning means for reversing the phase of electrical signals to obtain a reversal in the presentation of the image, a receiver connectable to the reversing means and to the scanning means for providing a visual indication in accordance with the elecrical signals introduced to the receiver, and switching means electrically connected to the receiver and to the scanning means and to the phase reversing means for connecting the receiver to the scanning means at first particular times and to the phase reversing means at second particular times.

5. The viewer set forth in claim 4 in which the optical system, the scanning means and the transparency are disposed in a fixed relationship to one another.

6. A viewer for providing an enlarged reversed image of a transparency, including, a television camera for scanning the transparency line by line and for providing video signals in accordance therewith which include blanking and synchronization pulses, means electrically connected to said camera for phase reversing the portion of said video signals representing the transparency without phase reversing the blanking and synchronization pulses, said phase reversing means including means for separating the blanking and synchronizing pulses from said video signals, a 180 degree phase shifting circuit electrically connected to said separating means for phase shifting said video signals representing the transparency, and a television receiver electrically connected to said separating means for receiving the blanking and synchronizing pulses and also electrically connected to said phase shifting means for receiving said phase shifted signals whereby an image in accordance with said phase shifted signals is provided, said 180 degree phase shifting circuit having a unity gain transistor amplifier, and a switch for decoupling said receiver from said phase shifting circuit and for connecting it directly to said separating means so that said video signals representing the transparency are provided directly thereto without a phase shift.

7. A viewer in accordance with claim 6 wherein a cathode follower is coupled to said receiver and connectable to said pentode amplifier, and wherein said switching means connects either said pentode amplifier or said separating means to said cathode follower whereby either a reversed or a direct image of the transparency is provided at said receiver.

References Cited in the file of this patent

UNITED STATES PATENTS

| | | |
|---|---|---|
| 2,214,072 | Biedermann | Sept. 10, 1940 |
| 2,226,997 | Schlesinger | Dec. 31, 1940 |
| 2,331,451 | Blaney | Oct. 12, 1943 |
| 2,515,846 | White | July 18, 1950 |
| 2,519,988 | Wilkie | Aug. 22, 1950 |
| 2,750,444 | Owens | June 12, 1956 |
| 2,764,697 | Duke | Sept. 25, 1956 |
| 3,002,048 | Bailey | Sept. 26, 1961 |